US012560816B2

(12) United States Patent
Fenney

(10) Patent No.: US 12,560,816 B2
(45) Date of Patent: Feb. 24, 2026

(54) LOW LATENCY DISTORTION UNIT FOR HEAD MOUNTED DISPLAYS

(71) Applicant: Imagination Technologies Limited, Kings Langley (GB)

(72) Inventor: Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 189 days.

(21) Appl. No.: 18/239,310

(22) Filed: Aug. 29, 2023

(65) Prior Publication Data

US 2023/0408822 A1     Dec. 21, 2023

Related U.S. Application Data

(63) Continuation of application No. 17/360,432, filed on Jun. 28, 2021, now Pat. No. 11,740,470, which is a (Continued)

(30) Foreign Application Priority Data

Aug. 15, 2017     (GB) ..................................... 1713051
Apr. 5, 2018     (GB) ..................................... 1805673

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0025* (2013.01); *G02B 27/017* (2013.01);
(Continued)

(58) Field of Classification Search
CPC .............. G02B 27/0172; G02B 27/017; G02B 27/0025; G06T 5/70; G06T 5/80;
(Continued)

(56) References Cited

U.S. PATENT DOCUMENTS 6,288,689 B1     9/2001   Shikama
6,941,400 B2     9/2005   Hungerbuehler et al.
(Continued)

FOREIGN PATENT DOCUMENTS

EP          1503333 A1     2/2005
EP          1742459 A1     1/2007
(Continued)

*Primary Examiner* — Michelle Chin
(74) *Attorney, Agent, or Firm* — Potomac Law Group, PLLC; Vincent M DeLuca

(57)          ABSTRACT

A graphics processing system for a head mounted display (or other non-standard projection display) comprises a low latency distortion unit which is separate from a graphics processing unit in the graphics processing system. The low latency distortion unit receives pixel data generated by the graphics processing system using a standard projection and performs a mapping operation to introduce distortion which is dependent upon the optical properties of the optical arrangement within the head mounted display. The distorted pixel data which is generated by the low latency distortion unit is then output to the display in the head mounted display.

19 Claims, 9 Drawing Sheets

Related U.S. Application Data continuation of application No. 15/998,400, filed on Aug. 15, 2018, now Pat. No. 11,079,597.

(51) Int. Cl.

| | |
|---|---|
| *G06T 5/70* | (2024.01) |
| *G06T 5/80* | (2024.01) |
| *G06T 15/00* | (2011.01) |
| *G06T 15/04* | (2011.01) |
| *H04N 9/31* | (2006.01) |

(52) U.S. Cl.
CPC ................. *G06T 5/70* (2024.01); *G06T 5/80* (2024.01); *G06T 15/005* (2013.01); *G06T 15/04* (2013.01); *H04N 9/3173* (2013.01); *H04N 9/3182* (2013.01); *H04N 9/3185* (2013.01); *H04N 9/3194* (2013.01); *G02B 2027/011* (2013.01); *G02B 2027/0116* (2013.01); *G02B 2027/014* (2013.01)

(58) Field of Classification Search
CPC ..... G06T 15/005; G06T 15/04; H04N 9/3173; H04N 9/3182; H04N 9/3185; H04N 9/3194
See application file for complete search history.

(56) References Cited

U.S. PATENT DOCUMENTS

| | | | |
|---|---|---|---|
| 8,711,173 | B2 | 4/2014 | Bratt et al. |
| 2002/0126117 | A1 | 9/2002 | Grzeszczjuk et al. |
| 2004/0125103 | A1 | 7/2004 | Kaufman et al. |
| 2004/0130669 | A1 | 7/2004 | Shin et al. |
| 2005/0083545 | A1 | 4/2005 | Takata et al. |
| 2008/0309884 | A1 | 12/2008 | O'Dor et al. |
| 2010/0091031 | A1 | 4/2010 | Tsujimoto |
| 2013/0169889 | A1 | 7/2013 | Kubota |
| 2013/0314501 | A1 | 11/2013 | Davidson et al. |
| 2014/0009368 | A1 | 1/2014 | Hirota |
| 2014/0333739 | A1 | 11/2014 | Yang et al. |
| 2016/0140701 | A1 | 5/2016 | Angara et al. |
| 2016/0364904 | A1 | 12/2016 | Parker et al. |
| 2017/0124980 | A1 | 5/2017 | Gossett |
| 2017/0193687 | A1 | 7/2017 | Lo et al. |
| 2017/0213394 | A1 | 7/2017 | Ratcliff et al. |
| 2017/0243319 | A1* | 8/2017 | Wittenbrink ............ G06T 15/00 |
| 2018/0253868 | A1* | 9/2018 | Bratt ...................... G06F 3/012 |
| 2018/0300932 | A1 | 10/2018 | Kuwahara et al. |
| 2018/0307305 | A1* | 10/2018 | Babu ...................... G06F 3/012 |
| 2018/0322688 | A1 | 11/2018 | Ozguner et al. |
| 2018/0350036 | A1 | 12/2018 | VanReenen et al. |

FOREIGN PATENT DOCUMENTS

| | | | |
|---|---|---|---|
| EP | 2884329 | A1 | 6/2015 |
| KR | 20100130344 | A | 12/2010 |
| WO | 2016/063617 | A1 | 4/2016 |
| WO | 2017/079162 | A1 | 5/2017 |

* cited by examiner

63
Pixel view direction
vector for Pixel "k"
Illumination from
Pixel "k"
Pixel
"k" 61
Pixel view direction
vector for Pixel "h"
64
Pixel
"h" 62
"focal point"
Lens
providing
wide-angled
view
HMD
Screen
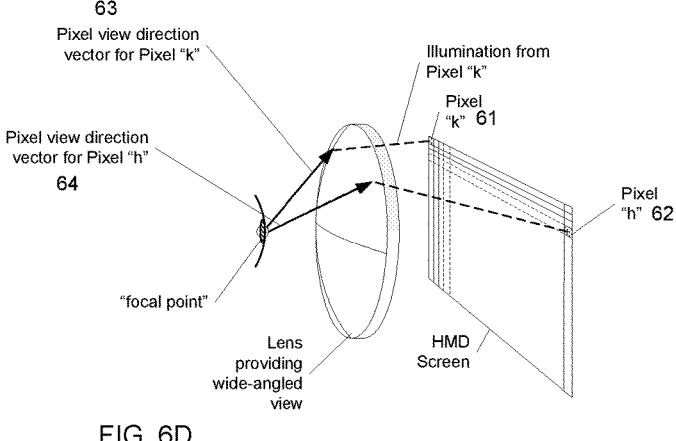
FIG. 6D
FIG. 6E
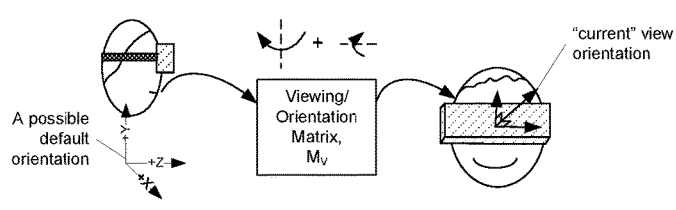
A possible
default
orientation
Viewing/
Orientation
Matrix,
$M_v$
"current" view
orientation

700

802

IC DEFINITION
DATASET

804

LAYOUT
PROCESSING

CIRCUIT
LAYOUT
DEFINITION

806

INTEGRATED
CIRCUIT
GENERATION

INTEGRATED
CIRCUIT

LOW LATENCY DISTORTION UNIT FOR HEAD MOUNTED DISPLAYS

CROSS REFERENCE TO RELATED APPLICATIONS AND CLAIM OF PRIORITY

This application is continuation under 35 U.S.C. 120 of application Ser. No. 17/360,432 filed Jun. 28, 2021, now U.S. Pat. No. 11,740,470, which is a continuation of prior application Ser. No. 15/998,400 filed Aug. 15, 2018, now U.S. Pat. No. 11,079,597, which claims foreign priority under 35 U.S.C. 119 from United Kingdom Application No. 1713051.9 filed Aug. 15, 2017 and United Kingdom Application No. 1805673.9 filed Apr. 5, 2018, the contents of which are incorporated herein by reference in their entirety.

BACKGROUND

Head mounted displays (HMDs) are wearable display devices which provide a display surface close to one or both of the wearer's eyes. They are typically used to provide an immersive virtual or augmented reality experience for the wearer. The closeness of the display surface to the wearer's eye(s) and/or the physical attachment of the display to the user's head introduce additional challenges compared to rendering graphics on a monitor or television screen which may be many centimetres (or further) from the viewer's eyes. For example, if the latency between the detection of head movement and displaying an updated rendered image corresponding to the new view direction is too large, it can result in the wearer experiencing motion sickness.

A second issue arises due to the desire to provide a wide field of view for each eye. To achieve this in a cost effective and ergonomic manner—and also to adjust the perceived focus depth distance of the image—a lens or system of lenses is typically placed between each eye and the display screen(s) of the HMD. This generally leads to requiring a 'distorted' image (i.e., distorted relative to that typically produced by a graphics rasterization system or even, say, a consumer camera), to be sent to the display. The lens undoes this distortion to produce the image seen by the eye.

The embodiments described below are provided by way of example only and are not limiting of implementations which solve any or all of the disadvantages of known graphics processing systems for head mounted displays.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A graphics processing system for a head mounted display (or other non-standard projection display) comprises a low latency distortion unit which is separate from a graphics processing unit in the graphics processing system. The low latency distortion unit receives pixel data generated by the graphics processing system using a standard projection and performs a mapping operation to introduce distortion which is dependent upon the optical properties of the optical arrangement within the head mounted display. The distorted pixel data which is generated by the low latency distortion unit is then output to the display in the head mounted display.

A first aspect provides a graphics processing system for a non-standard projection display comprising: a graphics processing unit configured to generate pixel data rendered with one or more standard projections; and a hardware distortion unit (402) configured to transform the pixel data generated by the GPU into distorted pixel data and output the distorted pixel data for display on a non-standard projection display.

A second aspect provides a method comprising: generating, in a graphics processing unit in a non-standard projection display, pixel data rendered with one or more standard projections; transforming, in a hardware distortion unit in the non-standard projection display, the pixel data generated by the GPU into distorted pixel data; and outputting the distorted pixel data for display on the non-standard projection display.

The graphics processing system may be embodied in hardware on an integrated circuit.

The hardware distortion unit described herein may be embodied in hardware on an integrated circuit. There may be provided a method of manufacturing, at an integrated circuit manufacturing system, a hardware distortion unit and/or a graphics processing system comprising the hardware distortion unit. There may be provided an integrated circuit definition dataset that, when processed in an integrated circuit manufacturing system, configures the system to manufacture a hardware distortion unit and/or a graphics processing system comprising the hardware distortion unit. There may be provided a non-transitory computer readable storage medium having stored thereon a computer readable description of a graphics processing system that, when processed in an integrated circuit manufacturing system, causes the integrated circuit manufacturing system to manufacture an integrated circuit embodying a hardware distortion unit as described herein and/or a graphics processing system comprising the hardware distortion unit.

There may be provided an integrated circuit manufacturing system comprising: a non-transitory computer readable storage medium having stored thereon a computer readable description of the hardware distortion unit and/or a graphics processing system comprising the hardware distortion unit; a layout processing system configured to process the computer readable description so as to generate a circuit layout description of an integrated circuit embodying the hardware distortion unit and/or a graphics processing system comprising the hardware distortion unit; and an integrated circuit generation system configured to manufacture the hardware distortion unit and/or a graphics processing system comprising the hardware distortion unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIGS. 3A, 3B and 3C show a graphical representation of the rendering process in the graphics processing system shown in FIG. 2;

FIG. 6A is a flow diagram showing an example method of operation of the hardware distortion unit shown in FIG. 5;

FIGS. 6B, 6C, 6D and 6E are show graphical representations various stages aspects of the method of FIG. 6A;

Figure 1:
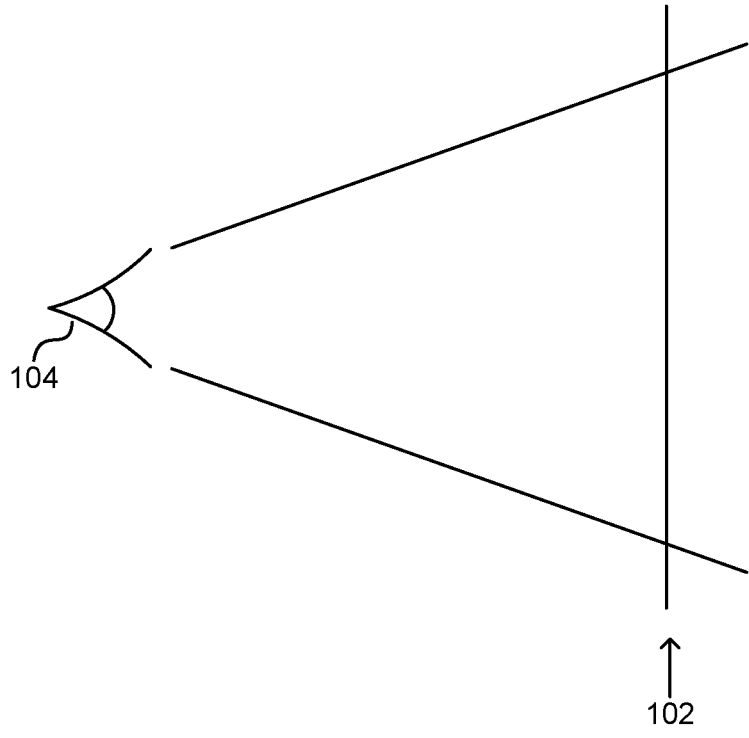
FIG. 1 is a schematic diagram showing the difference in projection of graphics between a standard, non-head mounted display and a head mounted display.
Figure 1:
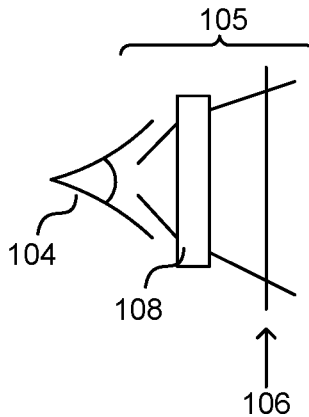

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 shows the difference in projection of graphics between a standard, non-head mounted display (e.g. a monitor, television, smartphone or tablet) and a head mounted display (HMD). With a standard, non-HMD display, the graphics are projected onto a display surface 102 which is distant from the viewer's eye 104 and is viewed directly by the viewer. In contrast, in a HMD 105, the display surface 106 is close to the viewer's eye 104 (e.g. less than 10 cm form the viewer's eye) and is viewed through an optical arrangement 108 which is part of the HMD 105 and comprises one or more lenses. The optical arrangement 108 can distort the viewed image so that it appears, to the wearer of the HMD, to fill a significant proportion (if not all) of their field of view, even though the display surface 106 may be planar and in some examples, is relatively small (compared to the size of the wearer's head).

Figure 2:
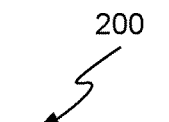
FIG. 2 is a schematic diagram of a graphics processing system for a head mounted display.
Figure 2:
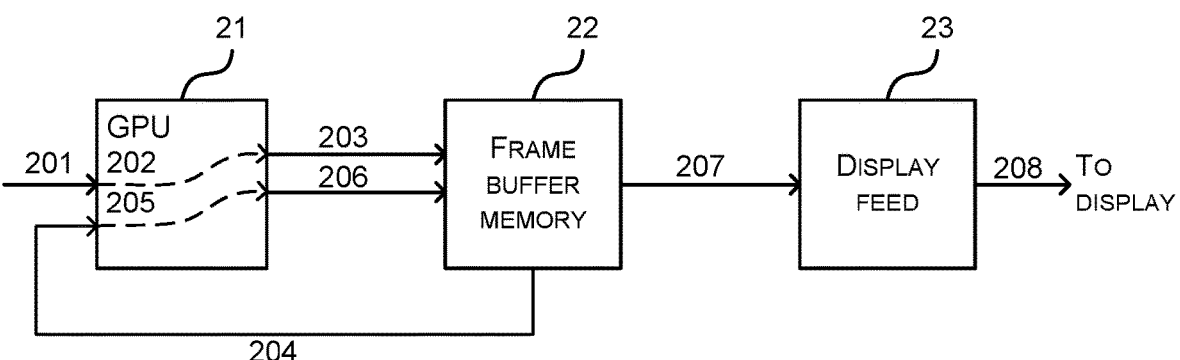
Figures 3A, 3B, 3C:
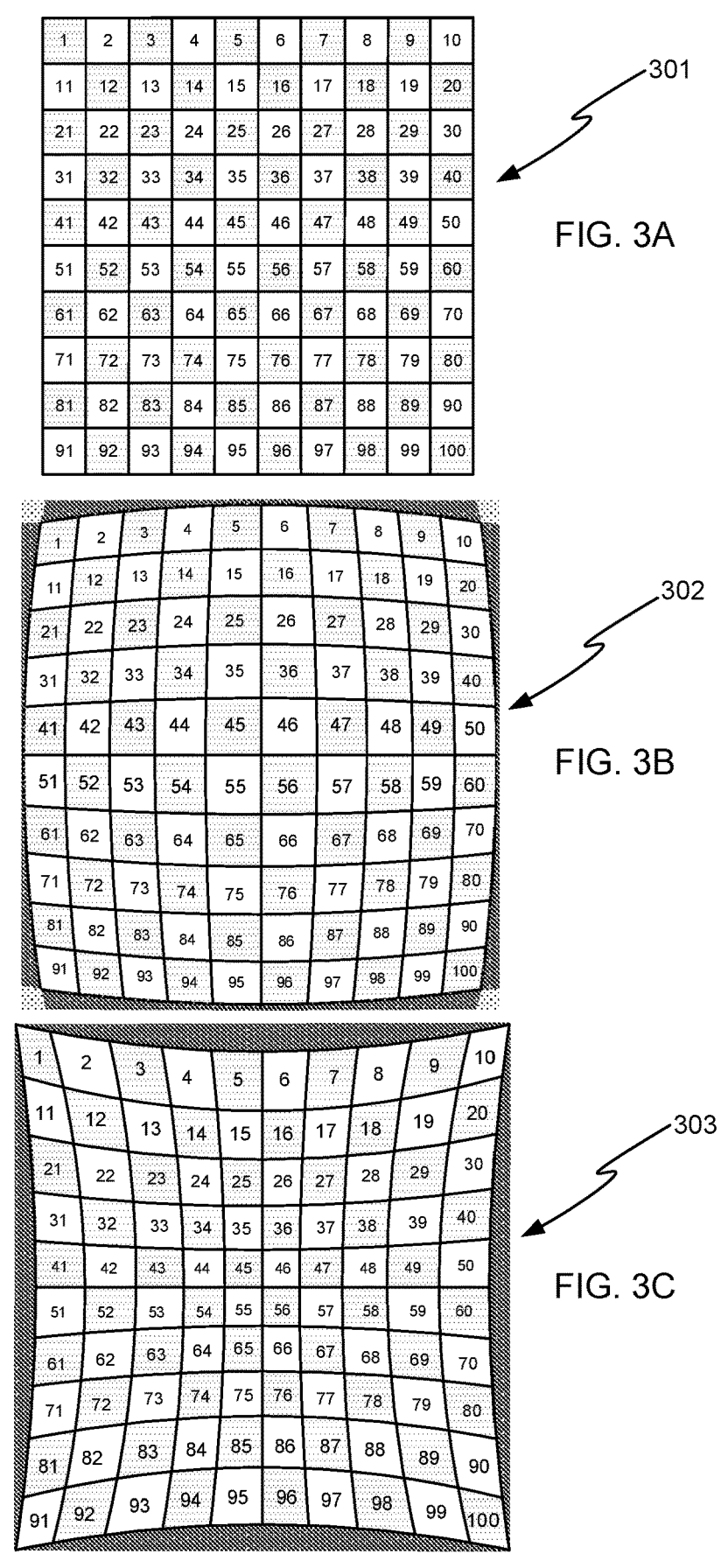

In order that the image appears correctly when viewed though the optical arrangement 108 of the HMD (e.g. such that the image provides a wide-angled view), the projected image (which may also be referred to as the displayed image) is pre-distorted as part of the rendering operation and this may be implemented in a second rendering pass performed by a graphics processing unit (GPU), as can be described with reference to FIG. 2 (which shows a graphics processing system 200) and FIGS. 3A-3C (which shows a graphical representation of the rendering process). As shown in FIG. 2, data is received by a GPU 21 (arrow 201) is rendered in a first pass (arrow 202) with a standard projection, e.g. such that the rendered scene is suitable for display on a standard, non-HMD display (e.g. the scene is rendered onto surface 102), and the output is stored in frame buffer memory 22 (arrow 203). FIG. 3A shows a graphical representation of the result 301 of this first pass render in the GPU 21 and this comprises a regular grid of regions of pixels (numbered 1-100 in the example shown in FIGS. 3B and 3C). A second pass render is then performed by the GPU (arrow 205) using the data from the first pass which is read from the frame buffer memory 22 (arrow 204) and this second pass applies distortion and the distorted result 302 is shown graphically in FIG. 3B. The pixel values of the distorted result 302 can be determined by sampling the intermediate framebuffer data 301 and filtering (e.g. interpolating) between the sampled pixel values. In the example shown in FIG. 3B, the distortion used is a barrel distortion (and hence the second pass result 302 is a barrel distorted image). The output of the second pass render is stored in frame buffer memory 22 (arrow 206). A display feed 23 (which may be implemented as a DAC) reads data out of the frame buffer memory 22 (arrow 207) and outputs it to the display (arrow 208). If the results of the first pass 301 were displayed on the display and viewed by the wearer of the HMD, the optical arrangement 108 in the HMD would produce a wide angle result 303, as shown graphically in FIG. 3C. The effect illustrated in FIG. 3C may be referred to as a "pincushion effect". However, when the distorted result 302 is displayed on the display and viewed by the wearer of the HMD, the combination of the distortion (applied in the second pass render 205) and the optical arrangement 108 in the HMD produces a an undistorted result similar to result 301, as shown in FIG. 3A. As well as introducing distortion, the second pass render (arrow 205) may also introduce some motion compensation (which may be required due to the additional latency incurred by a two pass approach).

The rendering approach shown in FIG. 2 and described above may be described as a brute force approach to the rendering process because it uses the GPU 21, which is a powerful processing device, to perform both rendering passes. However, by using two passes, the GPU resources are occupied for longer in order to render a single frame and so the efficiency of the graphics processing system is reduced. Further, the second pass, due to its sampling and (likely performance-constrained and thus simple) filtering of the intermediate framebuffer data 301, is likely to introduce additional unwanted image degradation such as blurring or aliasing.

Described herein is a graphics processing system which provides low latency rendering but does not use a second pass render on a GPU. The graphics processing system comprises a GPU and a hardware distortion unit which is separate from the GPU (e.g. it comprises physically separate hardware logic) but may, for example, be positioned on the same piece of silicon. The hardware distortion unit reads in pixel data generated by the GPU and which has been rendered with standard projection. The hardware distortion unit performs a mapping operation (which implements the distortion and may also correct for any flaws in the optical arrangement 108 in the HMD and/or introduce motion compensation) on the pixel data followed by a filtering operation (e.g. such that pixel data for an output pixel may be dependent upon more than one input pixel) and then outputs distorted pixel data. In various examples, this distorted pixel data is output directly to the display device, with pixel values computed and supplied in the required order for the display (e.g. in scan order).

The term 'standard projection' is used herein to refer to the rendering of pixel data for display on a standard, planar, non-HMD display, such that the pixels are arranged on a regular (x,y)-grid without any distortion (e.g. as shown in example 301 in FIG. 3A), e.g. a pin-hole camera-rendered image (or such as produced by "rectilinear lens" as often found in video and still cameras). In standard projection, straight lines in world space project to straight lines in the view. "Non-standard projection" is used herein to mean projection which does not fall into the meaning of "standard projection" as described above.

Figure 4A:
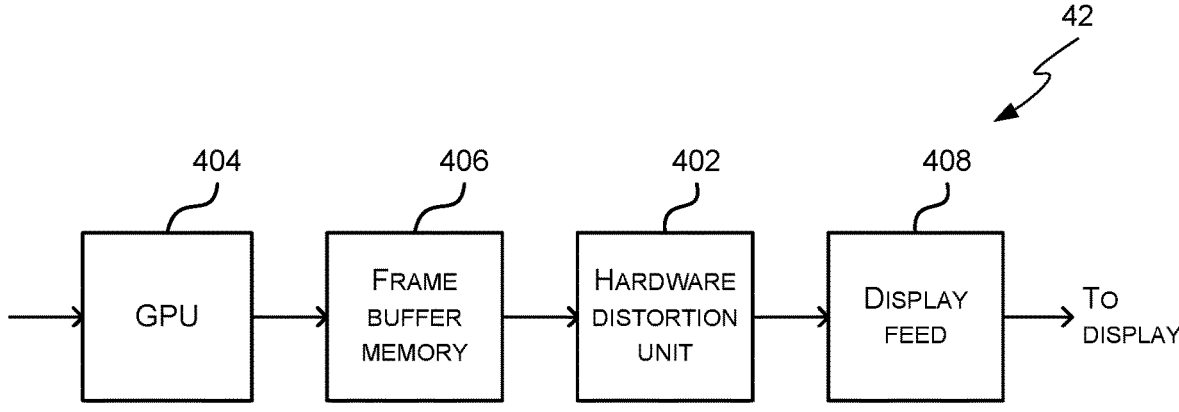
FIGS. 4A and 4B show schematic diagrams of two further example graphics processing systems for head mounted displays.
Figure 4B:
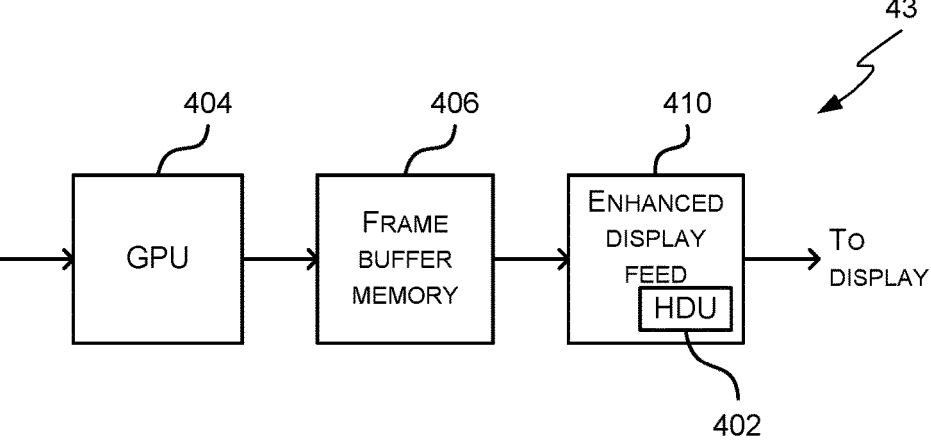

As shown in FIGS. 4A and 4B, the hardware distortion unit 402 may be implemented in one of a number of different places within a graphics processing system. In the first example graphics processing system 42 shown in FIG. 4A, the GPU 404 writes pixel data generated by the GPU (and which has been rendered with standard projection) into the frame buffer memory 406 and the hardware distortion unit (HDU) 402 reads the pixel data from the frame buffer memory 406 and outputs the distorted pixel data to the display feed 408. The display feed 408 then outputs distorted pixel data to the display. The term 'display feed' is used herein to refer to a device that accesses data from the framebuffer and transmits the data to the display device, even if the display itself accepts digital input and hence where implemented as a DAC, the DAC may not actually perform any digital to analogue conversion. In the second example graphics processing system 43 shown in FIG. 4B, the HDU 402 is incorporated into an enhanced display feed 410. The enhanced display feed 410 reads the pixel data (as generated by the GPU 404) out of the frame buffer memory 406 and outputs distorted pixel data, as generated by the HDU 402 within the enhanced display feed 410, to the display.

The display feed 408 and the enhanced display feed 410 shown in the graphics processing systems 42-43 in FIGS. 4A and 4B may be part of a display controller (or display pipeline) which outputs distorted pixel data to the display of a HMD or other projection system that comprises a lens that introduces some sort of distortion.

In the examples shown in FIGS. 4A and 4B, the HDU 402 may operate in the same, or a similar, manner and may comprise the same hardware logic.

Figure 5:
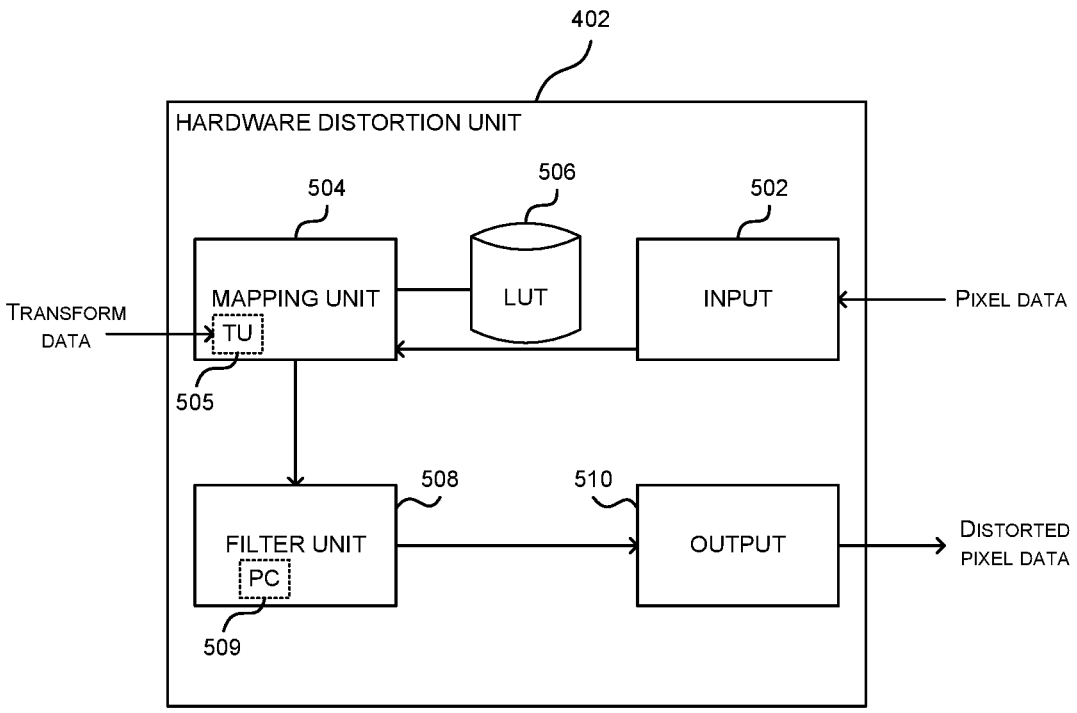
FIG. 5 is a schematic diagram of the hardware distortion unit shown in the systems in FIGS. 4A and 4B.

FIG. 5 is a schematic diagram showing the HDU 402 in more detail. As shown in FIG. 5, the HDU 402 comprises an input 502, a mapping unit 504, a filter unit 508 and an output 510. The input 502 receives pixel data which has been generated by a GPU and is the rendered result of a wide angle scene with standard projection or a cube map or part thereof (e.g. a half cube map). A cube map is an example of a rendered result of a wide angle scene with standard projection as each of the squares in a cube map is rendered with standard projection (and hence the cub map is rendered using multiple standard projections). The concept of a cube map is known in the art. The mapping unit 504 samples the pixel data (e.g. it steps through some or all of the pixels in the pixel data) and performs a mapping to introduce distortion and optionally to compensate for motion (e.g. to compensate for motion of the wearer's head between the start of the rendering process and the time at which the data is actually rendered on the display, where this motion may be measured and/or predicted) and/or correct for one or more flaws in the optical arrangement of the HMD.

The mapping unit 504 comprises a texture filtering unit that performs filtering (e.g. at least bilinear filtering, or higher order, e.g. bicubic filtering) either on a 2D texture or a cube map. For each resulting pixel displayed, the mapping unit 504 comprises hardware logic arranged to supply or derive the 2D coordinates or the 3D direction (where the 3D direction is used for a cube map and in various examples is also used in 2D case) of the source location in the frame buffer memory 406. The use of 2D coordinates or a 3D direction allows the use of fractional positions and the data for the nearby (e.g. adjacent) positions is then combined in the filter unit 508 based on the 2D coordinate or 3D direction.

In order that the mapping unit 504 can support "late" head motion compensation (e.g. compensation for the eventuality when the user's head has moved (e.g. rotated) in the time taken to render the geometry and perform the necessary distortion for the optical arrangement in the HMD which may be performed by rendering a bigger field of view than can be displayed and adjusting the portion that is actually displayed based on an updated view direction), the mapping unit 504, or a transformation unit (TU) 505 within the mapping unit 504, may receive as an input, at least one transformation matrix. This matrix may be a full 3D matrix transform (e.g. where a 3D direction is used) that is applied to each output pixel's direction to map it to a new direction prior to the filtering operation in the filter unit 508. Where a 2D coordinate is used, the transformation matrix will be smaller.

In many displays, all pixels are updated (or "lit") at the same time (e.g. many LCDs). The HDU 402 may be used for such displays and also for displays with a higher refresh rate, i.e. where the display refreshes faster than the framebuffer can be rendered, and in such examples, the head-motion matrix may be changed for the other frames. For a display where the pixels are "lit" sequentially (e.g. such that updates to the display roll down the screen), the mapping may, for example, be adjusted for sets of output lines.

The mapping that is performed by the mapping unit 504 may be texture mapping and this may depend upon the type of display used (e.g. a high vs. low persistence display, as described above).

The transform used in the mapping unit 504 to introduce the distortion is dependent upon the properties (e.g. the optical characteristics/design) of the optical arrangement 108 in the HMD. In an example, the transform may generate a barrel distorted image, although other HMDs may use different distortions. The transform may be stored in (or generated from data stored in) one or more look-up tables (LUTs) 506, such as a table of compressed normal directions (e.g. as described in GB patent 2391441). The distortion introduced by the mapping unit counteracts distortion introduced by the non-standard projection display (e.g. the HMD) when viewing images on the non-standard projection display (e.g. HMD).

As described above, the mapping unit 504 may compensate for motion (e.g. to compensate for motion of the wearer's head between the start of the rendering process and the time at which the data is actually rendered on the display, where this motion may be measured and/or predicted). This may be implemented by predicting or determining an updated view direction and then sampling and mapping the pixel data based on the updated view direction.

As described above, the transform used in the mapping unit 504 (to perform the mapping) may correct for one or more flaws in the optical arrangement of the HMD in addition to introducing the distortion such that the image appears undistorted when viewed through the optical arrangement of the HMD. These flaws, which may be a consequence of the use of very low cost (and hence low quality) optical elements in HMDs, result in geometric and/or chromatic distortion. In various examples, chromatic distortion may be corrected as part of the mapping operation (performed by the mapping unit 504) by adjusting the different colour channels (e.g. the RGB channels) differently. Alternatively, the mapping unit 504 may correct for geometric distortion caused by flaws in the optical arrangement and not chromatic distortion and the chromatic distortion may be corrected separately (e.g. as in image post process or later in the display pipeline).

In various examples the transform used in the mapping unit 504 may be modified to mitigate motion artefacts which are caused by the persistence of the display in the HMD (which may be an LCD display) in conjunction with rapid motion of an object across the field of review. In various examples, the transform used in the mapping unit 504 may be updated dynamically (in the transformation unit 505) based on transform data (e.g. a transformation matrix) supplied from a driving application and in various examples this transform data may comprise updated head position and/or orientation information and/or information on when frames had completed rendering and were ready to be warped and displayed.

In examples where the pixel data which is generated by the GPU 404 comprises a cube map or part of a cube map (e.g. a half cube map), the mapping unit 504 samples the pixel data based upon the view direction. In various examples, the view direction may be determined based in part upon motion data (i.e. where motion compensation is additionally performed as described above).

The filter unit 508 performs filtering (e.g. anisotropic or bilinear filtering) on the pixel data output by the mapping unit 504 (as described above). As shown in FIG. 5, the filter unit 508 may comprise a pixel cache (PC) 509. The filtering operation has the effect that the data for an output pixel (i.e. a pixel output from the HDU 402) depends upon the data for one or more pixels output by the mapping unit 504 and hence upon the data for one or more of the input pixels (i.e. one or more pixels output from the GPU 404). Whilst in various examples the filter unit 508 may be omitted and point sampling may be used instead of filtering, this may result in a lot of artefacts.

The output 510 of the HDU 402 outputs the distorted pixel data that is generated by the HDU 402 (in the combination of the mapping unit 504 and filter unit 508). In various examples, the output 510 of the HDU 402 does not write the distorted pixel data to a frame buffer but instead transmits the data, in raster order, to the display screen. As such, the HDU 402 performs its processing/warping/filtering on the fly.

Figures 6A, 6B, 6C:
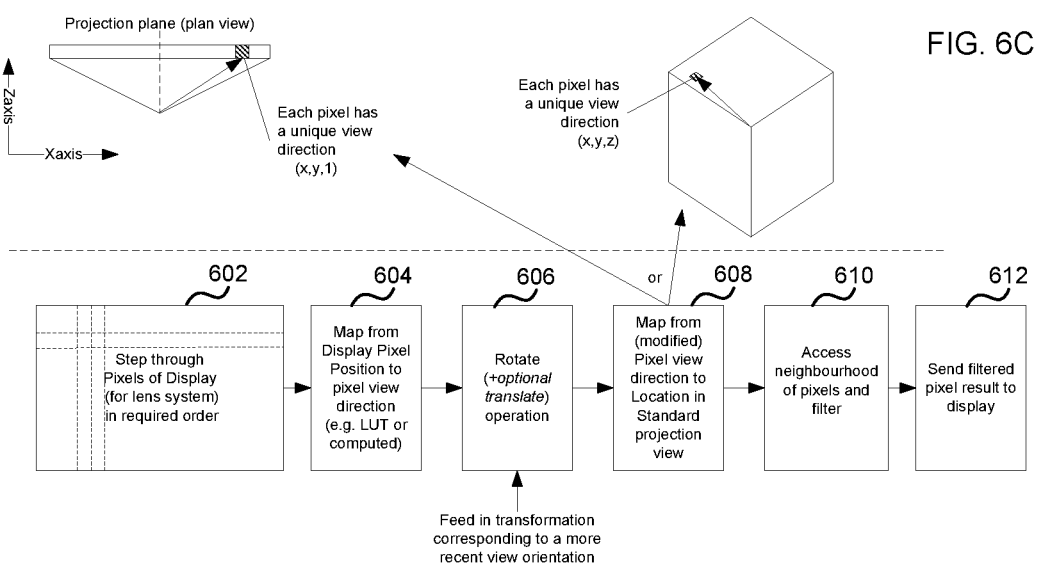

FIG. 6A is a flow diagram showing an example method of operation of the HDU 402. As shown in FIG. 6A, the mapping unit 504 steps through pixels of the display (for the optical arrangement) in raster order (block 602) and performs an initial mapping of each pixel from a display pixel position, e.g. as labelled 61, 62 in FIG. 6D, to a pixel view direction, e.g. as labelled 63, 64 in FIG. 6D (block 604). This mapping (in block 604) may, for example, use a look-up table or the mappings may be computed. The mapping unit 504 (or the transformation unit 505 within the mapping unit 504) may then apply a further rotation and/or translation to the pixel view directions (generated in block 604) based on updated view orientation data (block 606). FIG. 6E shows a graphical representation of how the view orientation data can change (e.g. from a default orientation to the current view orientation) and how the resulting change can be represented (e.g. in the form of a viewing/orientation matrix). The mapping unit 504 then applies a mapping which implements the required distortion (block 608). This second mapping operation maps pixels from their pixel view location (which may have been modified in block 606) to their location in standard projection view and hence applies the inverse of the distortion which is introduced by the non-standard projection display. The filter unit 508 then accesses neighbouring pixels and performs a filtering operation (block 610) before the output 510 outputs the filtered, distorted pixel result to the display (block 612).

The pixel view direction, as generated in the mapping unit 504 (in block 604) is shown graphically in FIGS. 6B, 6C and 6D. FIGS. 6B and 6D show examples for standard projection and FIG. 6C shows an example where a cube map is used. The pixel view direction determined for a display pixel position (and as shown in FIGS. 6B, 6C and 6D) is used to determine a pixel view location within the undistorted pixel data. Since the pixel view location is unlikely to correspond exactly to a pixel position within the undistorted pixel data, filtering (e.g. interpolation) can be performed based on a plurality of pixel values in the vicinity of the pixel view location in order to determine a value at the pixel view location.

Compared to the GPU 404, the HDU 402 may be described as a fixed function unit because it performs a pre-defined fixed set of functions (e.g. the mapping and filtering functions described above and optionally the application of transforms to handle late motion) and is not capable of performing any tasks aside from its pre-defined fixed set of functions (e.g. it is not capable of performing tasks by running software on a general purpose processing unit). Since the filtering function is performed in a fixed function unit, it can be optimised in hardware for this specific use (e.g. using a bicubic filtering unit as described in GB2529644 which is small to implement in terms of silicon area) to operate more efficiently (in terms of one or more of latency, power consumption and silicon area) than when filtering is implemented in the GPU 404. Furthermore, the HDU 402 does not perform any rasterization of triangles/polygons or any shading (both of which functions are performed by the GPU 404). The HDU 402 may be considered to perform non-linear image warping (which includes "texturing-like" operations) but with specialised transformations. Consequently, the HDU 402 is significantly smaller (in terms of amount of hardware logic and hence physical size) than the GPU 404 (e.g. it does not comprise any programmable units). In various examples, the HDU 402 only comprises the elements shown in FIG. 5, i.e. an input 502, output 510, mapping unit 504, filter unit 508 and memory arranged to store data used by the mapping and/or filter units (e.g. LUT 506). The HDU is distinct from the GPU. In other words, the HDU is separate from the GPU.

By using an HDU as described herein to perform the distortion of the pixel data (instead of a second render pass through the GPU which involves both a read of the pixel data from a pre-warped buffer and a write of the distorted data to a warped buffer), the overall efficiency of the graphics processing system is improved through increased parallelism and the latency of the rendering process may be reduced. In parallel with the processing performed by the HDU on a first frame of pixel data, the GPU can be rendering (in standard format) a second frame of pixel data (e.g. the next frame of pixel data). Furthermore, there is a reduction in the amount of data which is written to the frame buffer memory 406 (as can be clearly seen from a comparison of FIGS. 2 and 4) because the GPU 404 does not write the same frame of pixel data to the frame buffer memory twice. By using an HDU as described herein rather than performing a second render pass through the GPU, the amount of power used is also reduced.

The graphics processing systems 42-43 in FIGS. 4A and 4B and the HDU 402 in FIG. 5 are shown as comprising a number of functional blocks. This is schematic only and is not intended to define a strict division between different logic elements of such entities. Each functional block may be provided in any suitable manner. It is to be understood that intermediate values described herein as being formed by the mapping unit 504 and/or filter unit 508 need not be physically generated by the HDU 402 at any point and may merely represent logical values which conveniently describe the processing performed by the HDU 402 between its input 502 and output 510.

Figure 7:
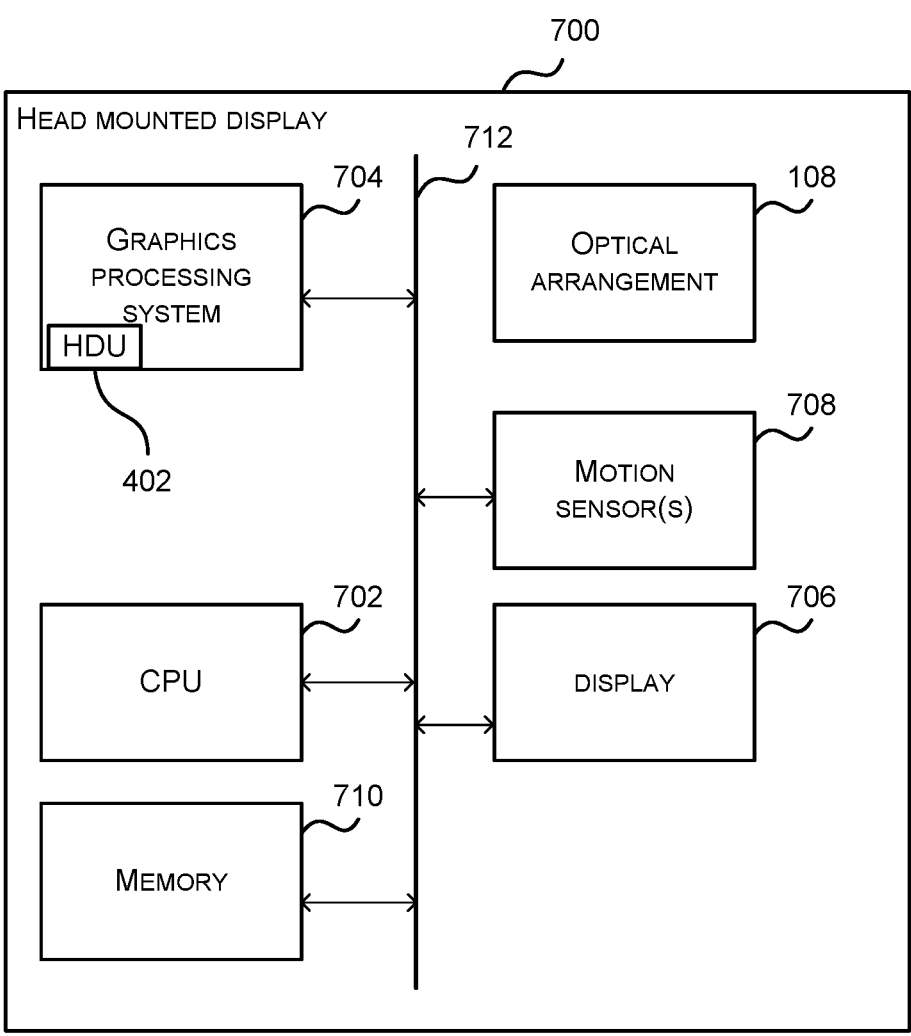
FIG. 7 shows a head mounted display in which one of the example graphics processing systems of FIGS. 4A and 4B may be implemented.

FIG. 7 shows a schematic diagram of a head mounted display 700 in which the graphics processing systems and HDU described herein may be implemented. The HMD 700 comprises a CPU 702, a graphics processing system 704 (which comprises a HDU 402), a display 706, one or more motion sensors 708 (to detect motion of the user's head), a memory 710 and an optical arrangement 108 (e.g. one or more lenses). The HMD 700 may also comprise other devices not shown in FIG. 7, such as inputs, outputs, speakers and/or a camera. The electronic components of the HMD may communicate with each other via a communications bus 712. The LUT 506 used by the mapping unit 504 of the HDU 402 may be implemented as part of the memory 710.

Whilst the graphics processing system and HDU is described above with reference to a HMD, the graphics processing system and HDU may alternatively be used for other types of projection systems, such as any type of projection system that comprises a lens that introduces some sort of distortion. Other examples include omnimax projection or fish-eye projection systems.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 8.

Figure 8:
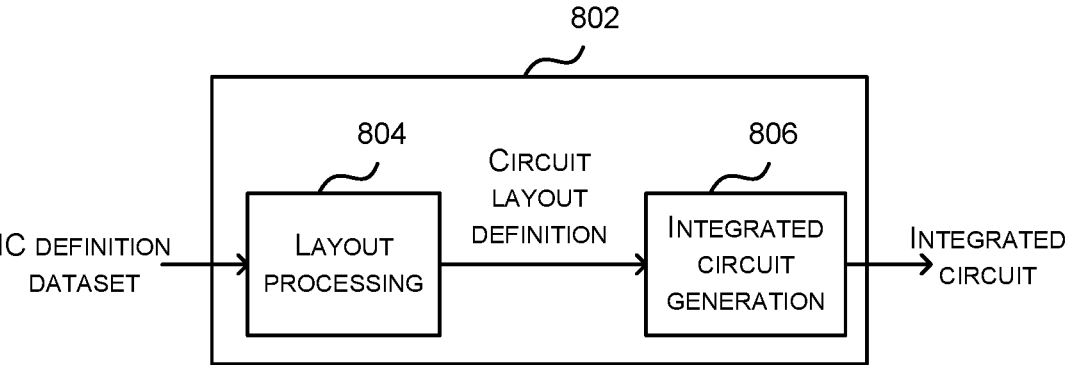
FIG. 8 shows an integrated circuit manufacturing system for generating an integrated circuit embodying a graphics processing system, such as one of the examples shown in FIGS. 4A and 4B.

FIG. 8 shows an example of an integrated circuit (IC) manufacturing system 802 which is configured to manufacture a graphics processing system as described in any of the examples herein. In particular, the IC manufacturing system 802 comprises a layout processing system 804 and an integrated circuit generation system 806. The IC manufacturing system 802 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 802 to manufacture an integrated circuit embodying a graphics processing system as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile.

Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing system for a head-mounted display (HMD) comprising:
   a graphics processing unit (GPU) configured to generate pixel data; and
   hardware logic separate from the GPU and configured to:
   perform a predefined fixed set of functions to transform the pixel data generated by the GPU into distorted pixel data which is suitable for display on the head mounted display, and
   output the distorted pixel data for display on the HMD;
   wherein the transformation performed by the predefined fixed set of functions is dependent upon input data comprising updated head position and/or orientation data.

2. The graphics processing system according to claim 1, wherein the graphics processing unit by use of the distinct hardware logic does not perform a pass through the GPU for the purposes of transforming the pixel data generated by the GPU into distorted pixel data.

3. The graphics processing system according to claim 1, wherein the hardware logic separate from the GPU outputs distorted pixels with computed pixel values and in the required order for direct display on the head mounted display.

4. The graphics processing system according to claim 1, wherein the hardware logic separate from the GPU comprises:
   mapping logic arranged to perform a mapping of the pixel data to introduce distortion; and
   transformation logic configured to adjust the mapping performed by the mapping logic in response to input data, and wherein the input data comprises at least one of updated head position; orientation data and a transformational matrix.

5. The graphics processing system according to claim 4, wherein the hardware logic separate from the GPU further comprises:
   an input configured to receive pixel data generated by the graphics processing unit; and an output configured to output distorted pixel data generated, at least in part, by the mapping logic.

6. The graphics processing system according to claim 5, wherein the output is configured to transmit the distorted pixel data in raster order to the HMD.

7. The graphics processing system according to claim 4, wherein the hardware logic separate from the GPU further comprises filter logic arranged to perform filtering of pixel data output by the mapping logic and provide the distorted pixel data to the output.

8. The graphics processing system according to claim 4, wherein the hardware logic separate from the GPU further comprises one or more look-up tables arranged to store mapping data and wherein the mapping logic is arranged to access the mapping data and to perform the mapping using the mapping data.

9. The graphics processing system according to claim 4, wherein the mapping performed by the mapping logic is a texture mapping.

10. The graphics processing system according to claim 1, wherein the distortion introduced is dependent upon an optical arrangement in the HMD.

11. A graphics processing system according to claim 1, wherein the hardware logic separate from the GPU is configured to output the distorted pixel data with computed pixel values and in the required order for direct display on the HMD.

12. The graphics processing system according to claim 1, further comprising a frame buffer memory wherein the graphics processing unit is arranged to output the pixel data to the frame buffer memory and the hardware logic separate from the GPU is arranged to read the pixel data from the frame buffer memory.

13. A head-mounted display comprising the graphics processing system according to claim 1.

14. A method of generating pixel data for a head mounted display (HMD), the method comprising:

generating, in a graphics processing unit (GPU) in a HMD, pixel data;

performing a predefined fixed set of functions to transform, in hardware logic separate from the GPU, the pixel data generated by the GPU into distorted pixel data which is suitable for display on the HMD; and outputting the distorted pixel data for display on the HMD;

wherein the transformation performed by the predefined fixed set of functions is dependent upon input data comprising updated head position and/or orientation data.

15. The method according to claim 14, wherein the graphics processing unit by using the hardware logic separate from the GPU does not perform a pass through the GPU for the purposes of transforming the pixel data generated by the GPU into distorted pixel data.

16. The method according to claim 14, wherein transforming the pixel data generated by the GPU into distorted pixel data comprises:

performing a mapping of the pixel data to introduce distortion and generate the distorted pixel data, wherein the mapping is adjusted in response to input data; and wherein the input data comprises at least one of updated head position, orientation data, and a transformational matrix.

17. A graphics processing system configured to perform the method as set forth in claim 14.

18. The graphics processing system of claim 17, wherein the graphics processing system is embodied in hardware on an integrated circuit.

19. A non-transitory computer readable storage medium having stored thereon computer readable code configured to cause the method as set forth in claim 14 to be performed when the code is run on at least one processor.

\* \* \* \* \*